US006126301A

United States Patent [19]

Altunay et al.

[11] Patent Number: 6,126,301

[45] Date of Patent: Oct. 3, 2000

[54] HEADLIGHT FOR A VEHICLE THAT FULFILLS LEGAL REQUIREMENTS OF DIFFERENT COUNTRIES

[75] Inventors: Esref Altunay, Reutlingen; Friedemann Schlienz, Tuebing, both of Germany

[73] Assignee: Robert Bosch GmbH, Stuttgart, Germany

[21] Appl. No.: 09/153,795

[22] Filed: Sep. 15, 1998

[30] Foreign Application Priority Data

Nov. 14, 1997 [DE] Germany ........................... 197 50 494

[51] Int. Cl.$^{7}$ ........................................................ B60Q 1/04

[52] U.S. Cl. .......................... 362/359; 362/512; 362/277; 362/319; 362/351; 362/539

[58] Field of Search ..................................... 362/359, 539, 362/351, 319, 322, 512, 277

[56] References Cited

U.S. PATENT DOCUMENTS 5,213,406 5/1993 Neumann et al. ....................... 362/539
5,673,990 10/1997 Neumann et al. ....................... 362/539

FOREIGN PATENT DOCUMENTS 42 38 273 A1 5/1994 Germany .

*Primary Examiner*—Thomas M. Sember
*Attorney, Agent, or Firm*—Michael J. Striker

[57] ABSTRACT

The headlight is used as a high beam headlight and has a light source (12) propagating light that is reflected by a reflector (10) as a light beam, which produces maximum illumination intensities that do not exceed legally prescribed maximum illumination intensities. The headlight light is designed so that the high maximum illumination intensities permissible in Europe according to the ECE Rules are produced by the light beam issuing from it. A screen device (20,30) is insertable in this headlight, by which a portion of the light issuing from the light source (12) to the reflector (10) is blocked and thus prevented from reaching the reflector. Because of that the maximum illumination intensities produced by the light beam issuing from the headlight are reduced so that the headlight can be used, for example in the USA or Japan, where reduced maximum illumination intensities are permitted in comparison to those in Europe, by insertion of the screen device in the otherwise unchanged headlight.

3 Claims, 3 Drawing Sheets

HEADLIGHT FOR A VEHICLE THAT FULFILLS LEGAL REQUIREMENTS OF DIFFERENT COUNTRIES

BACKGROUND OF THE INVENTION

1. Field of the Invention

The present invention relates to a headlight for a vehicle and, more particularly, to a high beam headlight for a vehicle, which illuminates the surroundings of the vehicle and produces maximum illumination intensities that do not exceed the legally prescribed maximum illumination intensities.

2. Prior Art

One such headlight is known from German Patent Application DE 42 38 273 A1. This headlight operates as a high beam headlight and has a light source and a reflector by which light propagated by the light source is reflected as a light beam that illuminates the surroundings in front of the motor vehicle. Maximum illumination intensities that do not exceed the legally prescribed maximum illumination intensities are provided by the headlight in the vicinity of the center of the road in front of the vehicle. The legal requirements for high beam headlights in the European Union are uniformly prescribed by the ECE Rules. There are however other legal requirements for high beam headlights in Japan and the United States, according to which the maximum allowed illumination intensities are lower than those permitted by the ECE Rules. Usually a special high beam headlight is developed and used to fulfill the different legal requirements for each different area of use. However this requires a comparatively large manufacturing expense and comparatively difficult logistics and storage in order to provide the different headlights.

SUMMARY OF THE INVENTION

It is an object of the invention to provide an improved headlight, especially a high beam headlight, for a vehicle that avoids the above-described disadvantage of a legally required replacement when the vehicle is used in a country or region having different legal requirements.

These objects, and others that will be made more apparent hereinafter, are attained in a headlight for a vehicle, especially a high beam headlight, comprising a light source and a reflector by which light propagated from the light source is reflected as a light beam that illuminates the vehicle surroundings and produces maximum illumination intensities that do not exceed legally permitted maximum illumination intensities.

According to the invention, the headlight has means for producing a light beam whose maximum illumination intensities do not exceed legally permitted maximum illumination intensities prescribed by a first set of legal requirements and a screen device (20,30) insertable into the headlight by which a portion of the light propagated by the light source toward the reflector is masked so that the maximum illumination intensities are reduced so that they do not exceed the legally permitted maximum illumination intensities prescribed by a second set of legal requirements that are less than the legally permitted maximum illumination intensities prescribed by the first set of legal requirements.

Advantageous embodiments of the above-described invention are described and claimed in the appended dependent claims. In a preferred embodiment the screen device may be shaped like a pot that surrounds the light source at least around a portion of its periphery and over a part of its longitudinal extent.

The screen device also may be inserted in the headlight in different positions relative to the light source in another preferred embodiment, whereby different portions of the light propagated from the light source to the reflector are masked by the screen device in the respective different positions. This embodiment of the invention has the advantage that only one embodiment of the screen device is required.

In another embodiment of the invention, in which light reflected by peripheral edge regions of the reflector would produce maximum illumination intensities, light propagated to those peripheral edge regions of the reflector from the light source is blocked by the screen device. This embodiment has the advantage that the maximum illumination intensities produced by the light beam issuing from the headlight can be reduced as desired.

BRIEF DESCRIPTION OF THE DRAWING

The objects, features and advantages of the invention will now be illustrated in more detail with the aid of the following description of the preferred embodiments, with reference to the accompanying figures in which.

DESCRIPTION OF THE PREFERRED EMBODIMENT

Figure 1:
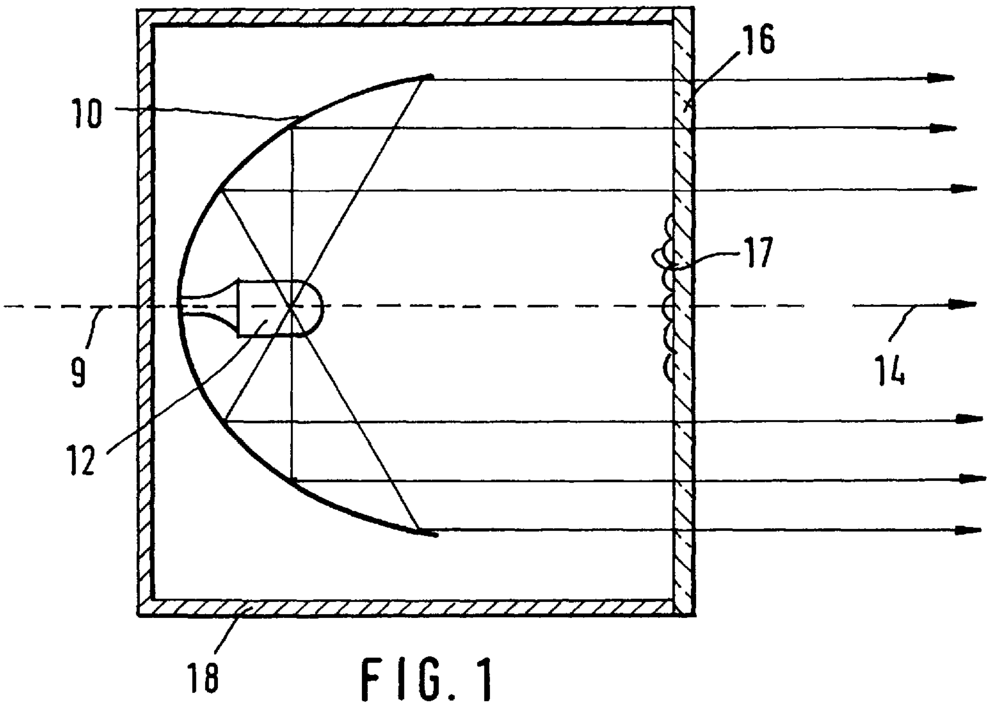
FIG. 1 is a simplified vertical cross-sectional view of a headlight according to the invention.

One embodiment of a headlight according to the invention is shown in FIG. 1 and described in detail in the following detailed description. The high beam headlight has a reflector 10, in which a light source 12 is placed in its peak region approximately coaxial with its optic axis 9 in an opening in its peak region. The light source 12 can be a gas discharge lamp or an incandescent lamp. Light propagated from the light source 12 is reflected by the reflector 10 as a light beam in the light propagation direction 14, which is indicated by several light rays in FIGS. 1, 3 and 5. A light permeable disk 16 can be arranged in the path of the light beam reflected from the reflector 10. This light permeable disk 16 simultaneously acts as a cover disk for the high beam headlight. The reflector 10 can be arranged in a housing 18, in which the disk 16 can also be mounted.

The disk 16 can be essentially smooth so that the light beam reflected from the reflector 10 is substantially unaffected by passing through the disk 16. In this case the shape of the reflector 10 is such that the light beam reflected by it already has a direction and distribution like a high beam headlight illuminating the surroundings in front of the vehicle. Alternatively the disk 16 can also have an optically active shape 17, by which the light beam reflected by the reflector 10 is deflected and/or scattered by passing through the disk 16. In this case the reflector 10 has a simple shape, for example a parabolic shape, and the light beam reflected by the reflector 10 is deflected and/or scattered by the optical shape of the disk 16 so that the high beam propagated from the high beam headlight has the required direction and distribution.

Figure 2:
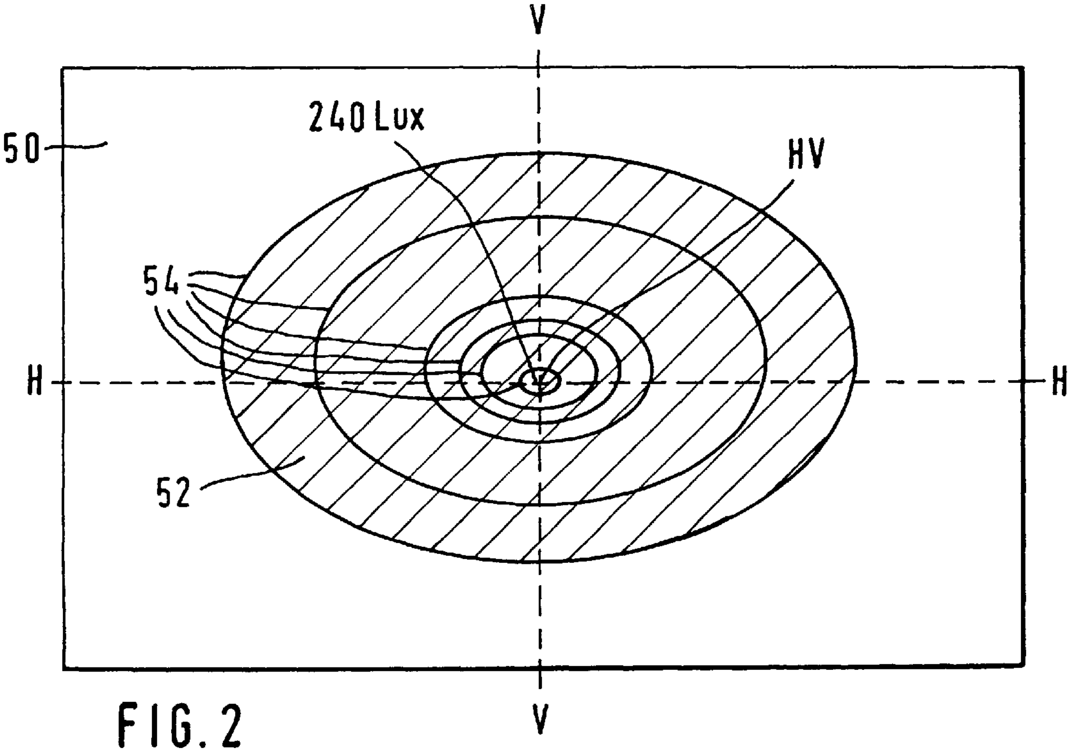
FIG. 2 is plan view of an illumination pattern shown on a measuring screen placed in front of the headlight of FIG. 1.

A high beam headlight according to a first embodiment is shown in FIG. 1, in which light propagated from the light source 12 can fall on the entire reflector and be reflected by it. The high beam headlight in this embodiment is for use in the countries of the European Union, in which the ECE Rules for high beam light apply. In FIG. 2 a measuring screen 50 is shown arranged perpendicular to the optic axis of the high beam headlight and spaced in front of it. The measuring screen is associated with a horizontal center plane indicated with HH passing through it perpendicular to it and a vertical center plane indicated with VV passing through it perpendicular to it. The horizontal center plane and the vertical center plane VV intersect at the center point HV. A region 52 is illuminated by the high beam propagated from the high beam headlight. This region 52 extends in a vertical direction over the horizontal center plane HH until at an angle of about 3° to 4° and under the horizontal center plane HH until at an angle of about 4°. This region 52 extends in a horizontal direction relative to the vertical center plane VV on both sides up to an angle of about 12°.

The highest illumination intensities, which reach a maximum of about 240 Lux, are present in a zone around the center point HV in the region 52. The maximum illumination intensities in the zone around the center point HV should amount to at most 240 Lux according to the ECE rules for the high beam light in effect in the European Union. The illumination intensities decrease toward the edges of the region 52. The illumination intensities in the region 52 are indicated by several lines 54 of equal illumination intensity, the so-called isolux lines. The high maximum illumination intensities in the zone around the center point HV is clearly indicated there by the denser isolux lines 54. The illumination intensities in the region 52 are at least about 2.4 Lux at an angle of about 12° on both sides of the vertical center plane VV and at about 2.5° below the horizontal center plane HH. The illumination intensities in the region 52 are at least about 1.6 Lux at an angle of about 12° on both sides of the vertical center plane VV and in the horizontal center plane HH. The high beam headlight is advantageously designed so that light reflected from the peripheral edge regions 11 of the reflector 10 illuminates the zone of the measuring screen around the center point HV and produces high illumination intensities there. The peripheral edge regions 11 of the reflector 10 are those regions of the reflector nearest to the forward edge of the reflector in the light propagation direction 14.

Figure 3:
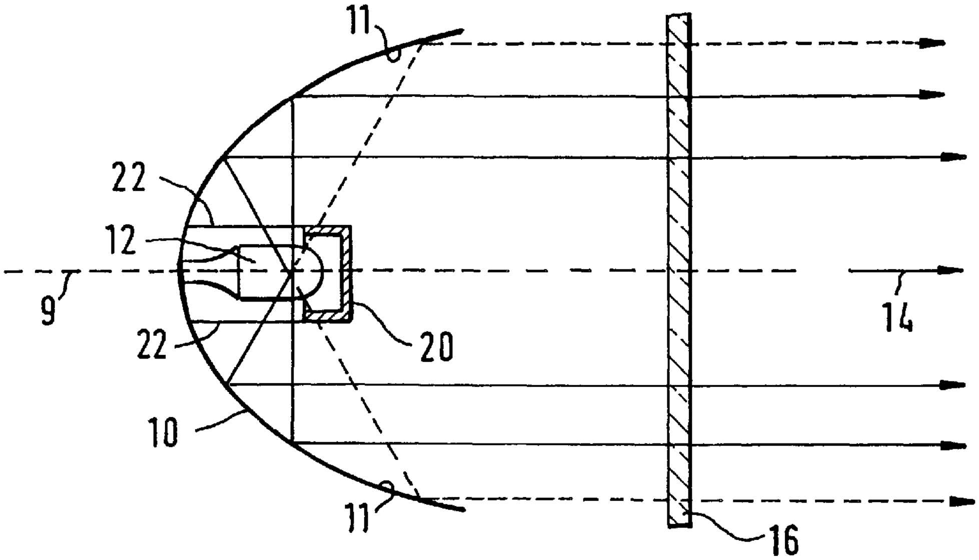
FIG. 3 is a simplified vertical cross-sectional view of the headlight of FIG. 1 with a screen device inserted in a first position to reduce the maximum illumination intensities.

A second embodiment of the high beam headlight is shown in FIG. 3, in which the basic structure and form of the reflector 10 and the disk 16 are identical with the first embodiment of the high beam headlight according to FIG. 1. In this second embodiment of the high beam headlight a screen device 20 is inserted in it, by which a part of the light propagated from the light source 12 to the reflector 10 is masked from the reflector, i.e. blocked from reaching it. The screen device 20 is, for example, pot-shaped, and surrounds the light source 12 around at least a part of the periphery of the light source or surrounds the entire circumference of the light source. The screen device 20 extends from the end of the light source 12 that points in the light propagation direction 14 over a part of the light source extending longitudinally inward from that end. The screen device 20 can also block light propagated from the light source 12 directly in the light propagation direction 14 that which would not impinge on the reflector 10. The screen device 20 can for example be made of plastic or curved metal sheet and, for example, can be held by one or more feet 22 projecting from it in a direction opposite to the light propagation direction. The screen device 20 can also be supported in any other arbitrary manner on the reflector or on the light source 12.

Figure 4:
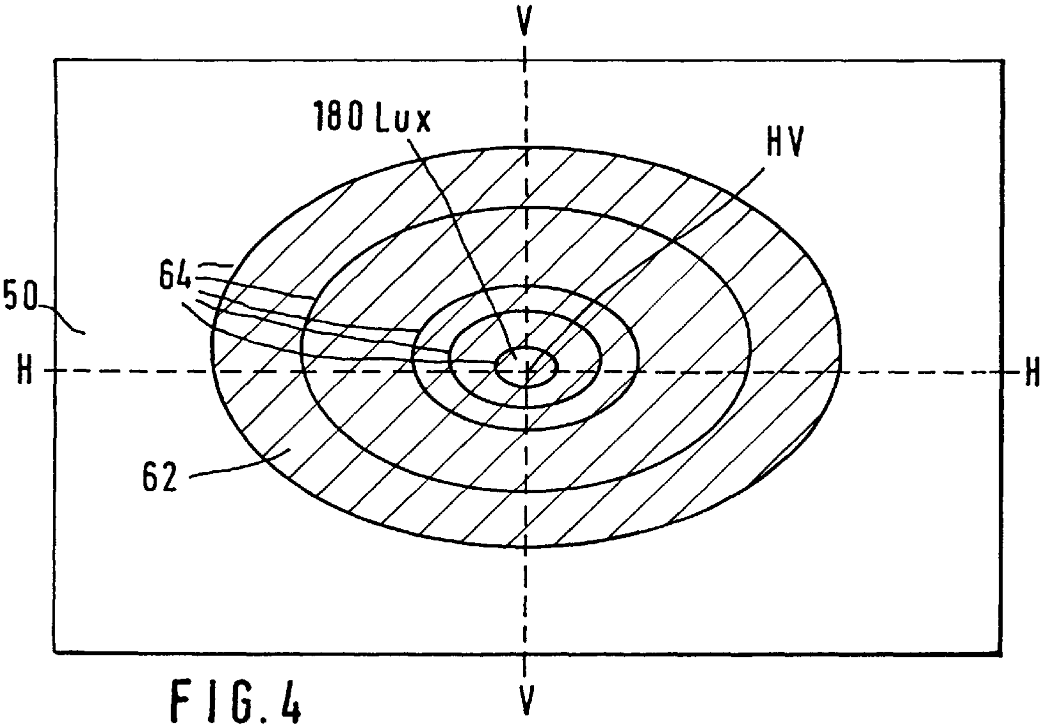
FIG. 4 is a plan view of a light illumination pattern shown on a measuring screen placed in front of the headlight of FIG. 3.

Light propagated from the light source 12 to the peripheral edge regions 11 of the reflector 10 is blocked by the screen device 20, so that no light is reflected by the edge regions 11 of the reflector 10. In FIG. 3 the masked or blocked portion of the light that is propagated from the light source 12 and would have been reflected from the reflector 10 is shown with dashed light rays. A measuring screen 50 is shown in FIG. 4, which is illuminated by this second embodiment of the high beam headlight. The region 62 is illuminated by the high beam, whose extent is unchanged in comparison to the region 52, however the maximum intensities present in the zone around the point HV in the region 62 are reduced. The maximum illumination intensities around the center point HV amount to at most about 180 Lux. In the edge zones of the region 62 substantially the same illumination intensities are present as in the region 52, since only the portion of the light beam reflected by the reflector 10 that illuminates the zone around the center point HV is blocked by the screen device 20. The maximum illumination intensities in the zone around the center point HV in the region 62 are reduced in comparison to those in the region 52 shown in FIG. 2 and are clearly indicated by the dense isolux lines 64. The legal requirements of the high beam light in Japan are fulfilled with this second embodiment of the high beam headlight according to the invention in which the maximum light intensities may not exceed 180 Lux.

Figure 5:
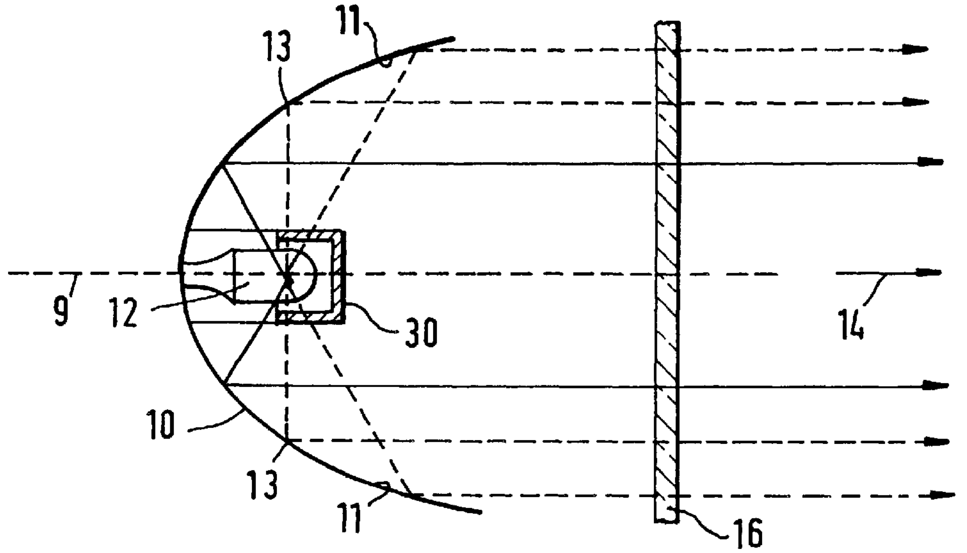
FIG. 5 is a simplified vertical cross-sectional view of the headlight of FIG. 1 with the screen device inserted in a second position to reduce the maximum illumination intensities.

A third embodiment of the high beam headlight is shown in FIG. 5, which has a basic structure and construction of the reflector 10 and the disk 16 that is identical to that in the first embodiment of the high beam headlight according to FIG. 1. As in the high beam headlight according to the second embodiment a screen device 30 is provided in the third embodiment of the high beam headlight, by which a part of the light propagated from the light source 12 to the reflector 10 is blocked or masked from the reflector. By the screen device 30 a greater portion of the light propagated from the light source 12 to the reflector 10 is screened than by the screen device 20 according to the second embodiment of the high beam headlight. The screen device 30 is again for example pot-shaped and surrounds the light source at least around a part of its periphery or surrounds the entire periphery of the light source. The screen device 30 extends from the end of the light source 12 that points in the light propagation direction 14 over a part of the light source extending longitudinally inward from that end. The screen device 30 can be identical with the screen device 20 according to the second embodiment however it can be arranged closer to the reflector 10 in a direction opposite to the light propagation direction 14 and thus cover a greater longitudinal extent of the light source 12. The screen device 20 and/or 30 can be arranged in two different positions along the optic axis 9 of the reflector. Alternatively the screen device 30 can also be constructed differently from the screen device 20 according to the second embodiment. It can have a pot-shaped section covering more of the light source by extending further longitudinally over the light source or it can extend over a greater portion of the periphery or circumference of the light source 12 than the screen device 20 of the second embodiment. In this case the same attaching points can be used for the screen device 30 of the third embodiment as the screen device 20 for the second embodiment.

Figure 6:
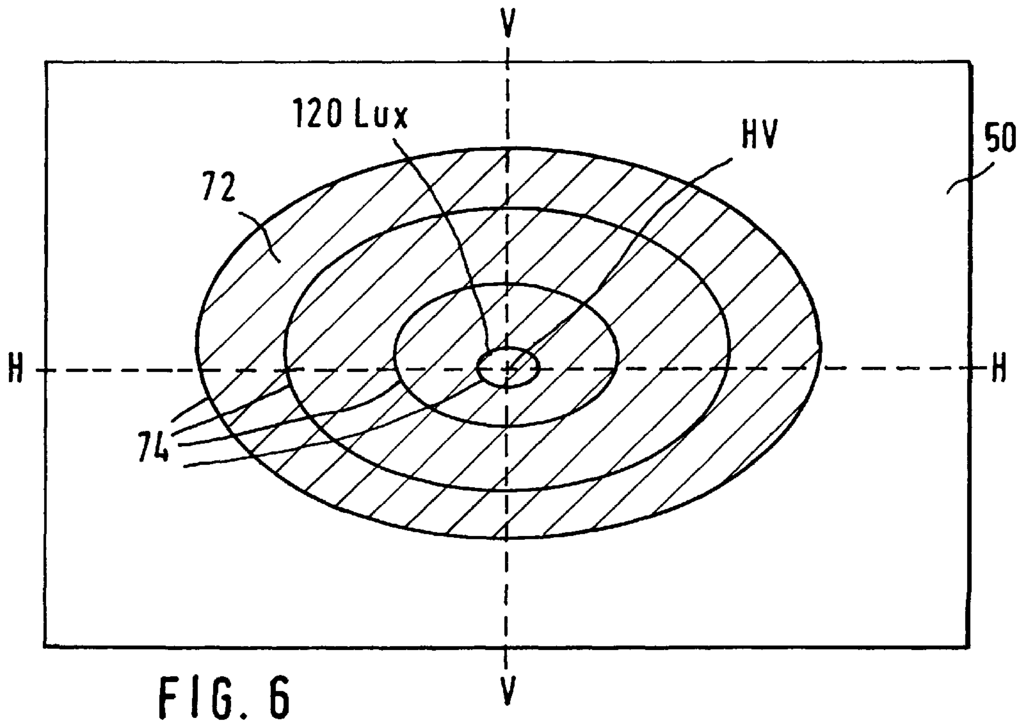
FIG. 6 is a plan view of a light illumination pattern shown on a measuring screen placed in front of the headlight of FIG. 5.

Light propagated from the light source 12 toward the peripheral edge regions 11 of the reflector 10 and to the adjoining regions 13 of reflector 10 further in toward the reflector peak is blocked by the screen device 20 so that no light is reflected by the edge regions 11 and the regions 13 of the reflector 10 next to them. The screened part of the light that would be reflected by the reflector 10 and propagated from the headlight is shown by the dashed lines in FIG. 5. The measuring screen 50 is shown in FIG. 6, which is illuminated by the high beam propagated from the third embodiment of the high beam headlight. The region 72 is illuminated by the high beam, whose extent is substantially unchanged relative to that of the region 52, however the maximum illumination intensities present in the zone around the center point HV are reduced in region 72. The reduced maximum illumination intensities are clearly shown by the less dense isolux lines 74. The maximum illumination intensities around the center point HV amount to at most about 120 Lux. In the edge zones of the region 72 substantially the same illumination intensities are present as in region 52, since substantially only a part of the light beam reflected by the reflector 10 is screened, which illuminates the zone around the center point HV. This third embodiment of the high beam headlight fulfills the legal requirements existing in the USA, in which the maximum illumination intensities may not exceed 120 Lux. The lowest values of the illumination intensities prescribed in the USA in the lateral regions of the measuring screen are however also fulfilled, since at least 1.6 or 2.4 Lux are present in the lateral regions to about 12° relative to the vertical center plane VV as in the first embodiment.

By insertion of the screen device 20 or 30 in the high beam headlight the maximum illumination intensities are reduced so much that a high beam headlight with otherwise identical structure can be used in different countries.

The disclosure of German Patent Application 197 50 494.9 of Nov. 14, 1997 is hereby explicitly incorporated by reference. This German Patent Application discloses the same invention as described herein and claimed in the claims appended hereinbelow and is the basis for a claim of priority for the instant invention under 35 U.S.C. 119.

While the invention has been illustrated and described as embodied in an improved headlight for a vehicle that fulfills legal requirements of different countries, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. A high beam headlight for a vehicle, said high beam headlight comprising a light source (12) including means for propagating light; and a reflector (10) arranged to reflect the light propagated from said light source and to form a high beam light beam for illumination of the surroundings of the vehicle to produce maximum illumination intensities which do not exceed first predetermined maximum illumination intensity values when all of the light propagated from said light source reaches said reflector; and a screen device (20,30) insertable into the high beam headlight, wherein a portion of the light propagated from said light source directed towards peripheral edge regions of said reflector (10) is blocked by said screen device so that the maximum illumination intensities of the high beam light beam emitted by the high beam headlight with said screen device inserted do not exceed second predetermined maximum illumination intensity values that are less than said first given maximum illumination intensity values.

2. The headlight as defined in claim 1, wherein the screen device (20,30) is pot-shaped and surrounds the light source (12) at least over a portion of a periphery of the light source (10) and over a part of a longitudinal extent of the light source (10).

3. The headlight as defined in claim 1, wherein the screen device (20,30) is insertable into the headlight in different positions relative to the light source (12) so as to block respective different amounts of the light propagated from the light source (12) toward the reflector (10).

* * * * *